May 31, 1927. 1,630,382
P. S. HANTON ET AL
WATER HEATER
Filed Sept. 23, 1924 2 Sheets-Sheet 1
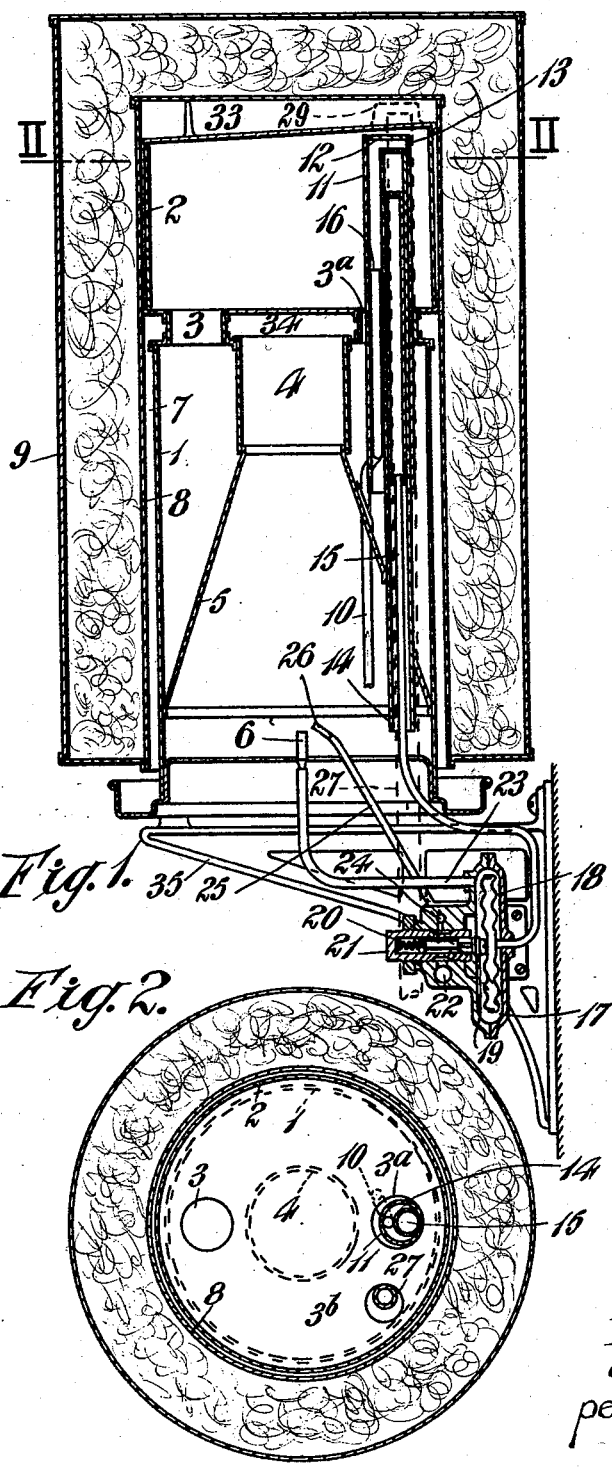
Inventors
Peter Stewart Hanton
and James Dick
per *Attorney.*

May 31, 1927. 1,630,382
P. S. HANTON ET AL
WATER HEATER
Filed Sept. 23, 1924 2 Sheets-Sheet 2
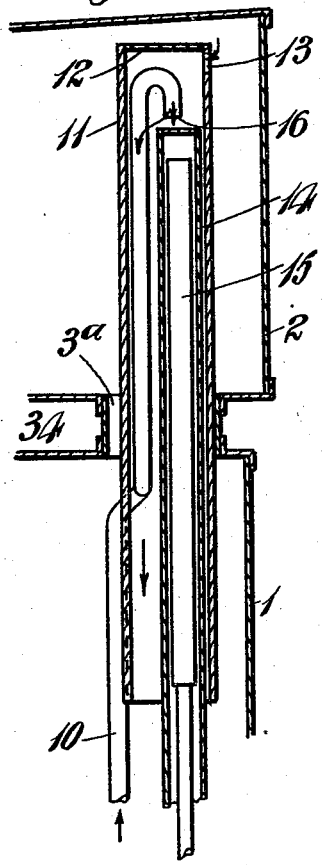
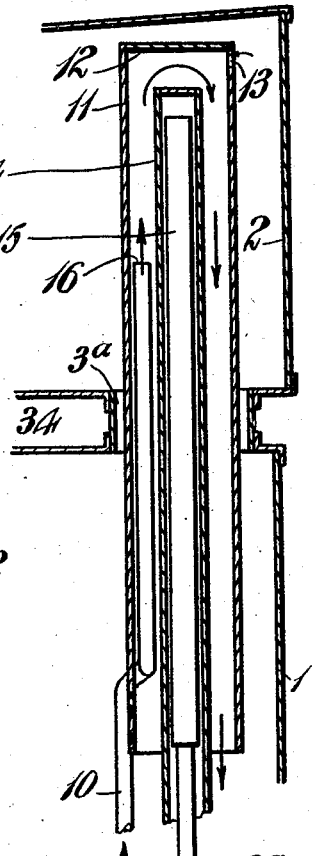
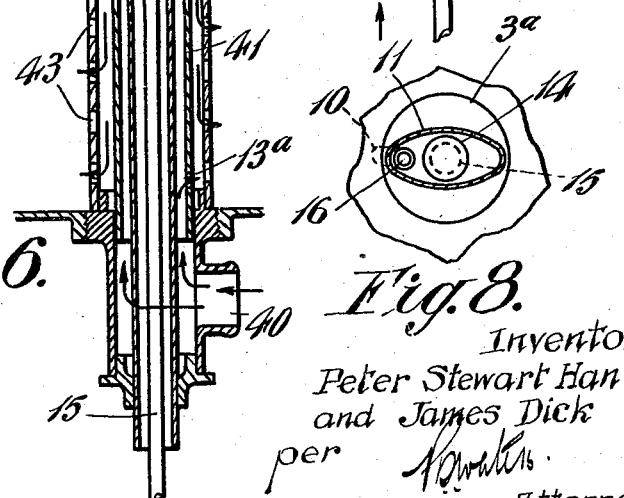
Inventors
Peter Stewart Hanton
and James Dick
per
Attorney.

Patented May 31, 1927.

1,630,382

UNITED STATES PATENT OFFICE.

PETER STEWART HANTON AND JAMES DICK, OF KEW, VICTORIA, AUSTRALIA.

WATER HEATER.

Application filed September 23, 1924, Serial No. 739,355, and in Australia October 8, 1923.

The present invention refers to hot water heaters of the type in which a water container is mounted above a fire box the heat from which passes upwardly through one or more flue passages thence along the top and down the outer sides of the water container to a point near the bottom of the latter. Further, in which an insulating cover is fitted about said container leaving top and side flue passages between the latter and the cover; and the hot water pipe extends from the top to the bottom of the container and is maintained open to prevent pressure being set up in the heater. A water heating apparatus embodying above features is the subject of Australian Patent No. 11229, dated 26th May, 1919.

While the arrangements of water container with cover and flue passages mentioned is found in practice to possess a high degree of utility when used as a continuous heater, i. e. with a gas burner of small capacity burning continuously in the fire box, it follows as a result of the flue passage over the top of the water chamber that the heat tends to concentrate in that position and thus set up a high temperature in a small quantity of the water in the top of the water container. The vapour so formed passes down the open end of the hot water pipe and gives an indication of boiling water which is however not present or if so only in a very small quantity. Again the pressure so set up tends to depress the top surface of the water away from the top wall of the container resulting in that portion of the wall becoming over heated.

By continued experiment the applicants have ascertained that the unequal heating effect mentioned can be minimized with better efficiency results if the water container is constructed so that the upper flue passages instead of passing over the top of said container proceed through the same at a distance below the top. With such an arrangement of the upper flue passages the insulated cover will bear directly upon the top of the water container.

As a water heating apparatus constructed with the upper flue passage arranged as stated will be readily capable of furnishing boiling water, and once the water has reached such a temperature it will be unnecessary to continuously apply the heat, the present invention also contemplates a further improvement in heaters whereby the gas supply may be automatically controlled by thermostatic means.

A practical form of the invention is illustrated in the accompanying drawings whereof, Figure 1 is a vertical section through the apparatus, and, Figure 2 a horizontal section on line II—II thereof,

Figure 3 an enlarged fragmentary vertical section of the thermostatic control means, Figure 4 an enlarged detail of the discharge means, Figures 5, 6, 7 and 8 are fragmentary details illustrating slight modifications.

In the practical structural form illustrated the water container is supported on a bracket 35 and the lower compartment 1 is of cylindrical form communicating at its top end by means of a series of cylindrical passages 3, 3ª, 3ᵇ, with the upper cylindrical compartment 2 of the container.

The lower compartment 1 has a cylindrical central flue 4 extending centrally from the top and flared at its lower end 5 to join the side of said compartment near its lower end. The gas jet or jets 6 are located in the lower end of the flue and the fumes pass through the upper end of the flue along the horizontal space 34 between the superposed compartments 1 and 2 and down an annular space 7 formed between the wall of the lower compartment 1 and the inner wall 8 of the insulated hood or casing 9 that surrounds the water container.

The water inlet pipe 10 passes up through the flared portion of the flue and into the lower compartment 1 and then into a vertical intake chamber 11 open at the bottom and extending freely through one of the passages 3ª to near the top of the upper compartment 2, said chamber having a top 12 and an aperture 13 for water or steam circulation.

Within the chamber is fixed a smaller tube 14 open at the bottom and closed at the top which reaches near the top of the chamber and extends downwardly into the flared end 5 of the flue.

Located within said tube is a sealed pipe 15 containing a fluid expansible under heat such as water which is responsive to the temperature of the water in the chamber 11 through contact of said water with the tube 14 and in particular to the water delivered near the upper end of chamber 11 from the open outlet end 16 of the water inlet pipe 10. The outlet end 16 of pipe 10 may be extended to deliver upon the top of the tube 14 as in Figure 5.

The upper end of the sealed pipe 15 that is within the tube 14 may be enlarged as illustrated and said pipe 15 forms part of an automatic thermostatic device for controlling the gas supply and leads into a gas chamber 17 on the bracket 35 where said pipe is fixed to one side of a flexible hollow metal diaphragm 18.

The opposite side of the diaphragm bears against a valve 19 controlled by a spring 20 in a valve chamber 21. In the latter is a gas supply port 22 that delivers gas through the valve 19 into the gas chamber 17 from which a pipe 23 leads to the gas jet or jets 6.

The chamber 21 has also a pilot gas port 24 which is permanently communicated with the gas supply when the control cock of same is open and said port 24 connects with the tube 25 of the pilot jet 26 that lights the gas burners when the gas is emitted therefrom.

Thus when the water in the chamber is sufficiently hot the liquid in the thermostatic pipe 15 expands and operates the diaphragm 18 to close the supply valve 19 thus extinguishing the jets 6. Similarly when cold water is delivered through the outlet 16 of supply pipe 10 the sealed pipe 15 is immediately cooled thus permitting the gas supply valve to open by its spring and the pilot jet again lights the gas jet.

The water outlet pipe 27 passes up through the flared portion 5 of the flue into compartment 1 through passage 3ᵇ into the upper compartment 2 and its open top end 28 extends into a dome 29, Figure 4, provided on the top of said upper compartment.

The dome 29 projects upwardly into a space 33 provided between the top of compartment 2 and the roof of the insulated hood or casing 9.

The operation of the apparatus is as follows:—Assuming the water in the container to be heated and the gas supply cut off, cold water delivered through pipe 10 passes up by pressure into chamber 11 returns down and into compartment 1 and displaces the hot water in lower compartment 1 thus causing the hot water in the upper compartment to be discharged down outlet pipe 27.

During this operation it is desirable to prevent cold water diluting and cooling the water in upper compartment while at the same time it is essential to cool the thermostat pipe 15 to permit the gas supply valve to open and deliver gas to the jets 6.

The modified form of construction illustrated in Figure 5 accomplishes these objects in a very satisfactory manner as the cold water being delivered at the upper end of the chamber causes the hot water in the latter to be driven down into the lower compartment and its place taken by the cold water which keeps pipe 15 cool. Immediately the cold water supply cock is closed a slow process of circulation begins depending on the size of the aperture 13. The cold water in the chamber 11 descends and hot water from the upper compartment 2 passes through aperture 13 to take its place and as soon as the heat in the casing is sufficient the thermostat valve 19 is closed and the gas jets extinguished.

If the water delivery construction as shown in Figures 1, 2 and 3 is varied so that the chamber is oval as shown in Figures 7 and 8 the water pipe 10 may come in directly through the side of the water container into chamber 11 or as shown in Figure 7 with its outlet end 16 directed upwardly so that the direction of the cold water will be upwardly over the top of the tube 14 and downwardly with the object above explained.

The same object is achieved by the modified construction shown in Figure 6. Herein the water enters directly at 40 into a sleeve 41 closed at the bottom and having above the water inlet a circulation aperture 13ᵃ and said sleeve extends upwardly into a chamber 42 with a circulation aperture 13, and provided about its lower end with outlet apertures 43. Said sleeve 41 is open at the top and the thermostat pipe 15 extends into the tube 14 which passes up through the bottom of the sleeve 41. In this case the cold water passes up the inside of the sleeve and down between the outside of same and the chamber and passes through the apertures 43.

When the water is heated circulation is also set up through aperture 13.

We claim:—

1. In a domestic water heater, a burner, a container for water to be heated by said burner, an intake chamber of substantial height within said container and having a lower open end freely communicating with the interior of said container, and an upper end closed except for one or more restricted passages communicating with said container, means for admitting supply water to the upper part of said chamber, and temperature-responsive means within said chamber for controlling the supply of fuel to said burner, said temperature-responsive means being in a position to be actuated by the incoming supply water.

2. In a domestic water heater, a burner, a container for water to be heated by said burner, an intake chamber of substantial height within said container, having a lower open end freely communicating with the interior of said container, and an upper end closed except for one or more small passages connecting the upper portion of said chamber with said container, means for admitting supply water to the upper part of said chamber, and a receptacle within said chamber adapted to contain a temperature-responsive fluid, said receptacle being disposed in the path of the incoming supply water.

3. In a water heater, a container for water, means for heating said water, an intake chamber of substantial height disposed within said container, said intake chamber having its lower portion freely communicating with the interior of said container, and its upper portion closed except for one or more restricted passages connecting the upper portion of said chamber with the interior of said container, means for admitting supply water to the interior of said chamber, and temperature-responsive means within said chamber adapted to actuate a control for said heating means, said temperature-responsive means being so positioned as to be actuated by the incoming supply water.

Dated this 16th day of August, 1924.

PETER STEWART HANTON.
JAMES DICK.